United States Patent
Matsubayashi et al.

[11] Patent Number: 5,855,069
[45] Date of Patent: Jan. 5, 1999

[54] DISENGAGEMENT-PREVENTING MECHANISM AND BUSH CUTTER PROVIDED WITH DISENGAGEMENT-PREVENTING MECHANISM

[75] Inventors: Tatsuhiko Matsubayashi, Kanagawa; Osamu Tada; Takayuki Yamamoto, both of Tokyo, all of Japan

[73] Assignee: Kioritz Corporation, Tokyo, Japan

[21] Appl. No.: 857,484

[22] Filed: May 16, 1997

[30] Foreign Application Priority Data

May 21, 1996 [JP] Japan .................................... 8-125738

[51] Int. Cl.⁶ .............................. A01G 3/06; A01D 34/63
[52] U.S. Cl. ................................................. 30/276; 56/12.7
[58] Field of Search ........................ 30/276, 381; 56/12.7

[56] References Cited

U.S. PATENT DOCUMENTS

| | | | |
|---|---|---|---|
| 4,670,985 | 6/1987 | Biersteker | 30/381 |
| 4,759,128 | 7/1988 | Katoh et al. | 30/276 |
| 4,841,929 | 6/1989 | Tuggle et al. | 30/276 |
| 5,375,666 | 12/1994 | Pettet et al. | 30/276 |

FOREIGN PATENT DOCUMENTS 7-10039  3/1995  Japan .

*Primary Examiner*—Hwei-Slu Payer
*Attorney, Agent, or Firm*—Chapman and Cutler

[57] ABSTRACT

A disengagement-preventing mechanism for a vibration isolator is interposed between an attachment sleeve portion of prime mover and an operating rod in a bush cutter. The disengagement-preventing mechanism includes an attachment sleeve portion, an attachment member which is to be inserted in and engaged with the attachment sleeve portion, and a C-shaped disengagement-preventing clip. The attachment sleeve portion is provided, at a peripheral wall thereof, with a clip-introducing slit extending in a circumferential direction of the attachment sleeve portion and with a clip-holding slit located so as to face the clip-introducing slit. The disengagement-preventing clip is adapted to be introduced from outside into the clip-introducing slit and brought into contact with an external end face of the attachment member. The clip is also adapted to be engaged, by way of the distal end portion thereof, with the clip-holding slit.

10 Claims, 7 Drawing Sheets

DISENGAGEMENT-PREVENTING MECHANISM AND BUSH CUTTER PROVIDED WITH DISENGAGEMENT-PREVENTING MECHANISM

BACKGROUND OF THE INVENTION

1. Field of the Invention

This invention relates to a disengagement-preventing mechanism and, in particular, to a disengagement-preventing mechanism for a vibration isolator which is interposed between an attachment sleeve portion of prime mover and an operating rod in a bush cutter.

2. Description of Related Art

A bush cutter of this kind is generally constructed such that a cutting device equipped with a knife or blade rotor is attached at one end (a distal end portion) of an operating rod. A prime mover, such as a small air-cooled two-cycle gasoline engine, is mounted at the other end (a rear end portion) of the operating rod. The motive power from the prime mover is transmitted to the knife rotor via a transmission shaft coaxially disposed in the operating rod. A bush-cutting operation using this bush cutter can be performed by manipulation of the operating rod handled by an operator.

Assembling the operating rod and the prime mover together is performed by inserting the rear end portion of the operating rod into the attachment sleeve portion of a fan cover for the prime mover. In this way, the operating rod is detachably engaged with the attachment sleeve portion. A pipe-like retainer, equipped with a vibration isolator, is provided at the coupling between the attachment sleeve portion of the fan cover and the distal end portion of the operating rod so as to prevent the vibration of the prime mover from being transmitted to the operating rod.

FIGS. 6 and 7 illustrate one example of the structure of the coupling between the attachment sleeve portion of a fan cover of the prime mover and the rear end portion of the operating rod in a conventional bush cutter (Japanese Utility Model Publication Hei/7-10039). In FIGS. 6 and 7, a fan cover 52 covering a prime mover 51 is formed integral with an attachment sleeve portion 53 in which, or at the innermost side of which, a driving shaft 54 constituting an output power member of a centrifugal clutch (not shown) is rotatably held by a bearing 55. A tubular rubber vibration isolator 56 is fitted in the attachment sleeve portion 53 in such a manner that it contacts the inner peripheral wall of the attachment sleeve portion 53. This vibration isolator 56 is secured in a suitable way to a pipe-like retainer 57 which is coaxially disposed in contact with the inner peripheral wall of the vibration isolator 56.

A transmission shaft 59 is rotatably received within an operating rod 58. The rear end portion of the operating rod 58 is fittingly inserted into the pipe-like retainer 57 so as to be fastened by the pipe-like retainer 57. In this case, the rear end portion 59a of the transmission shaft 59 is also fittingly inserted into the driving shaft 54 supported by the bearing 55 within the fan cover 52 so that the transmission shaft 59 can be rotated in accordance with the rotation of the driving shaft 54.

As mentioned above, since the vibration isolator 56 is interposed between the attachment sleeve portion 53 of the fan cover 52 and the operating rod 58, the transmission of vibration from the prime mover 51 to the operating rod 58 can be suppressed, thereby preventing unpleasant vibration of the prime mover 51 from reaching an operator handling the operating rod 58 while carrying out bush cutting.

The pipe-like retainer 57 fixedly provided with the vibration isolator 56 is adapted to be detachable from the attachment sleeve portion 53 by inserting the pipe-like retainer 57 in the same direction as the insertion direction of the operating rod 58 to the attachment sleeve portion 53. Structural measures to prevent movement in an axial direction between the inner peripheral wall of the attachment sleeve portion 53 and the outer peripheral wall of the vibration isolator 56 during a bush cutting operation, i.e. a disengagement of the vibration isolator 56 from the attachment sleeve portion 53 during a bush cutting operation, must be taken.

Because of this, a disengagement-preventing clip 60 is disposed so as to contact the face of an external end 56a (the left side in FIG. 6) of the vibration isolator 56 so as to prevent the pipe-like retainer 57 (including the vibration isolator 56) and the operating rod 58 from being disengaged from the attachment sleeve portion 53. As shown in FIG. 7, the disengagement-preventing clip 60 is formed of a C-shaped fine steel wire having a suitable degree of elasticity and adapted to be entirely received in the opening section of the attachment sleeve portion 53. This disengagement-preventing clip 60 is provided with a couple of angled portions 60a diametrically facing one another. The angled portions 60a are adapted to be elastically fitted in a couple of slits 61 which are formed along the periphery of the attachment sleeve portion 53 and spaced apart by an angle of 180 degrees so as to diametrically face each other. Fitting the angled portions 60a in these slits 61 permits the disengagement-preventing clip 60 to be locked within the attachment sleeve portion 53. At the same time, the external end face 56a of the vibration isolator 56 is brought into contact with the disengagement-preventing clip 60 thereby preventing the vibration isolator 56 from being disengaged from the attachment sleeve portion 53.

The disengagement-preventing clip 60 is designed to be set in the attachment sleeve portion 53 in such a manner that the clip 60 is entirely disposed within the attachment sleeve portion 53 and the elastic fitting thereof in the aforementioned couple of slits 61 is effected by directing the clip 60 from the inside to the outside of the attachment sleeve portion 53. Consequently, the clip 60 must be introduced into the attachment sleeve portion 53 by directing it in the same direction as the direction in which the pipe-like retainer 57 carrying the vibration isolator 56 is inserted into the attachment sleeve portion 53. In this case, the outer diameter of the clip 60 must be contracted against the elastic force of the clip 60 so as to allow the clip 60 to be introduced from the open end portion of the attachment sleeve portion 53 into the interior of the attachment sleeve portion 53. Both the operation of setting the clip 60 in the attachment sleeve portion 53 and the operation of detaching the clip 60 from the attachment sleeve portion 53 are very troublesome.

SUMMARY OF THE INVENTION

This invention has been made after considering the circumstances mentioned above. An object of the present invention is to provide an improved disengagement-preventing mechanism and, in particular, to provide an improved disengagement-preventing mechanism for a vibration isolator which is to be interposed at a coupling between an attachment sleeve portion formed integrally with a fan cover of prime mover and an operating rod in a bush cutter. The object of the present invention, in other words, is to provide a disengagement-preventing mechanism for a vibration isolator which is capable of facilitating the engagement and disengagement between the attachment sleeve portion and the operating rod.

In order to realize the aforementioned object, this invention provides a disengagement-preventing mechanism which comprises an attachment sleeve portion, an attachment member to be inserted in and engaged with the attachment sleeve portion, and a disengagement-preventing clip. The attachment sleeve portion is provided at a peripheral wall thereof with a clip-introducing slit extending in a circumferential direction of the attachment sleeve portion and with a clip-holding slit located so as to face the clip-introducing slit. The disengagement-preventing clip is adapted to be introduced from outside into the clip-introducing slit thereby being brought into contact with an external end face of the attachment member. The clip is also adapted to be engaged, by way of the distal end portion thereof, with the clip-holding slit.

Moreover, according to the present invention, the disengagement-preventing clip is formed of a C-shaped elastic wire having an intermediate curved section. A couple of externally projecting bent portions or a couple of externally extending bent ends constitute the distal end portion which is to be engaged with the clip-holding slit. The attachment sleeve portion is provided, at a peripheral wall thereof, with a pair of clip-introducing slits spaced apart by a predetermined distance from each other along the circumference of the attachment sleeve portion. A clip-engaging groove is formed between the pair of clip-introducing slits. At least one clip-holding slit has an inclined face cut so as to be engaged with the bent portions or bent ends of the disengagement-preventing clip for preventing the bent portions or bent ends from moving in the direction of disengagement.

Moreover, according to the present invention, the improved bush cutter includes an attachment sleeve portion of a prime mover, an operating rod to be inserted in and engaged with the attachment sleeve portion, a vibration isolator to be interposed between the attachment sleeve portion and the operating rod, and a coupling portion provided with a disengagement-preventing clip. The attachment sleeve portion is provided at a peripheral wall thereof with a clip-introducing slit extending in a circumferential direction of the attachment sleeve portion and with a clip-holding slit located to face the clip-introducing slit. The disengagement-preventing clip is adapted to be introduced from outside into the clip-introducing slit thereby being brought into contact with an external end face of the vibration isolator. The clip is also adapted to be engaged, by way of the distal end portion thereof, with the clip-holding slit. The vibration isolator is integrally mounted on an outer peripheral wall surface of a tubular retainer into which the operating rod is inserted and secured thereto.

Coupling can be performed as follows. First of all, the pipe-like retainer carrying a vibration isolator is inserted into the attachment sleeve portion in such a manner that the vibration isolator is closely fitted within the inner peripheral wall of the attachment sleeve portion. The distal end portion of the disengagement-preventing clip is then introduced from the clip-introducing slits formed in the outer peripheral wall of the attachment sleeve portion into the interior of the attachment sleeve portion to such an extent that the distal end portions of the disengagement-preventing clip are respectively fitted in the clip-holding slits and directed from the inside to the outside thereof. Introduction of the disengagement-preventing clip is accomplished as the middle portion of the C-shaped disengagement-preventing clip is fitted in the clip-engaging groove formed between said pair of clip-introducing slits. At this moment, a couple of the bent portions constituting the distal end portions of the disengagement-preventing clip are energized or deformed so as to move away from each other and hence pressure-contacted with the inclined cut-faces of the clip-holding slits.

The inclined cut-faces of the clip-holding slits are shaped such that the outside portions of the bent portions come into contact with the inclined cut-faces and are prevented from slipping out of the clip-holding slits. As a result, the disengagement-preventing clip can be firmly held in place. When the disengagement-preventing clip is introduced into the attachment sleeve portion in this manner, the inserted portion of the disengagement-preventing clip is brought into contact with an external end face of the vibration isolator, thereby preventing the vibration isolator from slipping out of the attachment sleeve portion and preventing the prime mover portion from being unexpectedly disengaged from the operating rod.

DESCRIPTION OF THE PREFERRED EMBODIMENTS

Figure 1:
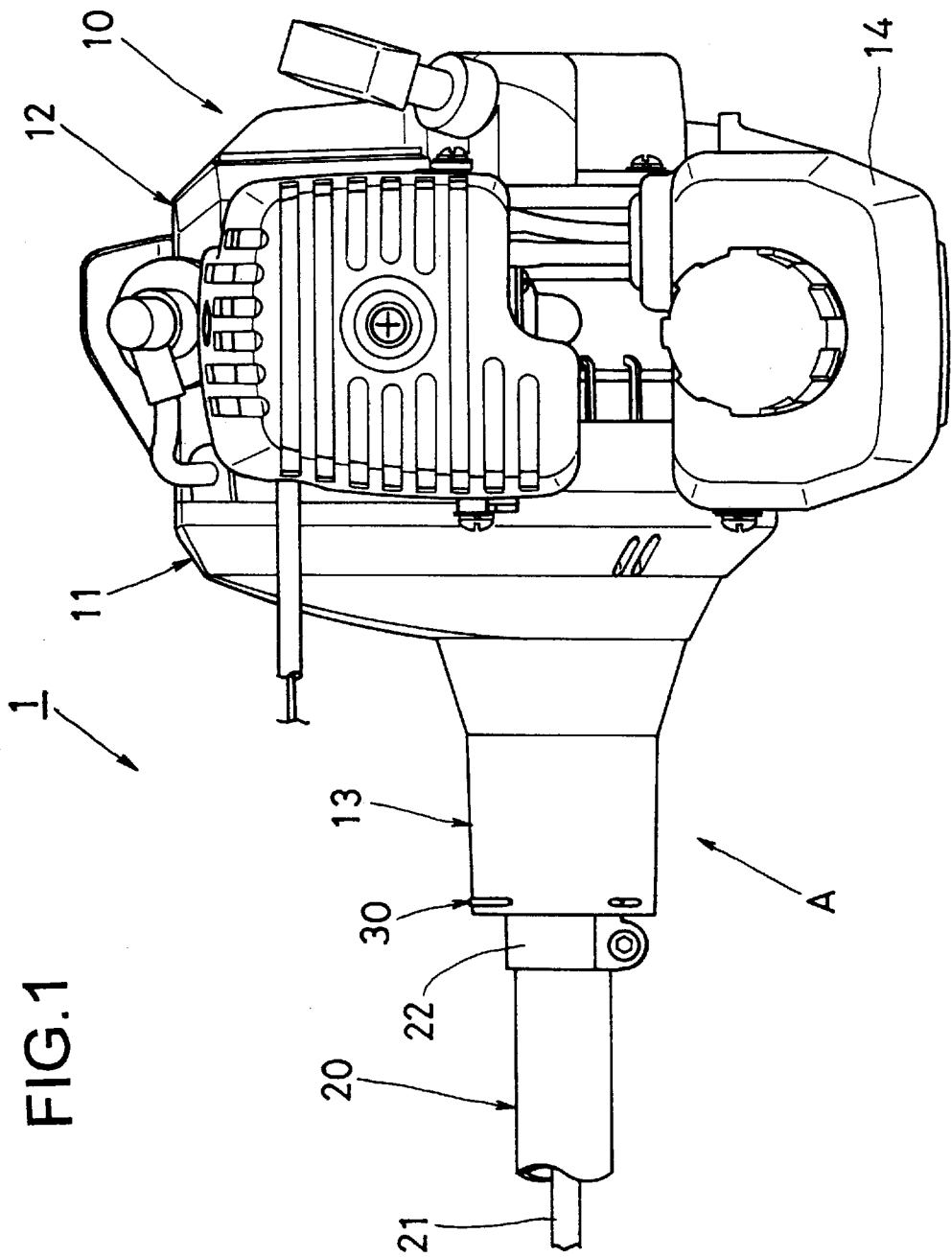
FIG. 1 is a side elevational view of the prime mover of a bush cutter coupled to an operating rod according to one embodiment of this invention.
Figure 2:
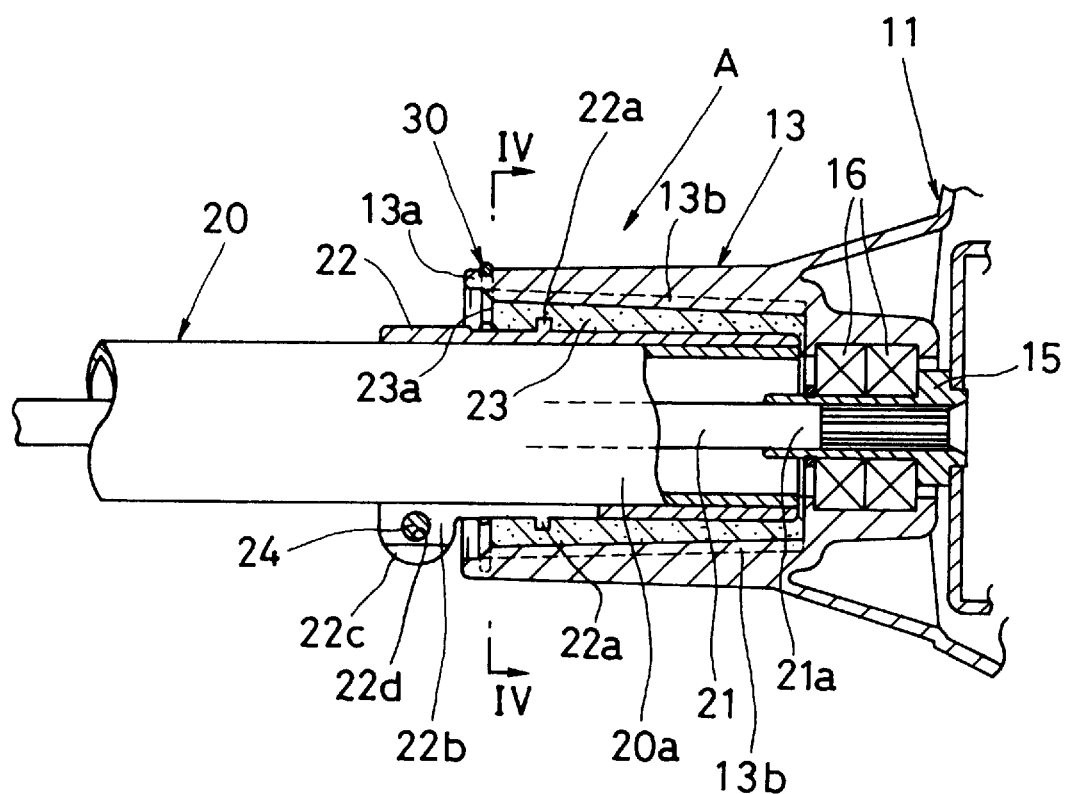
FIG. 2 is a longitudinal sectional view illustrating the coupling between an attachment sleeve portion of the prime mover and the operating rod shown in FIG. 1.
Figure 3:
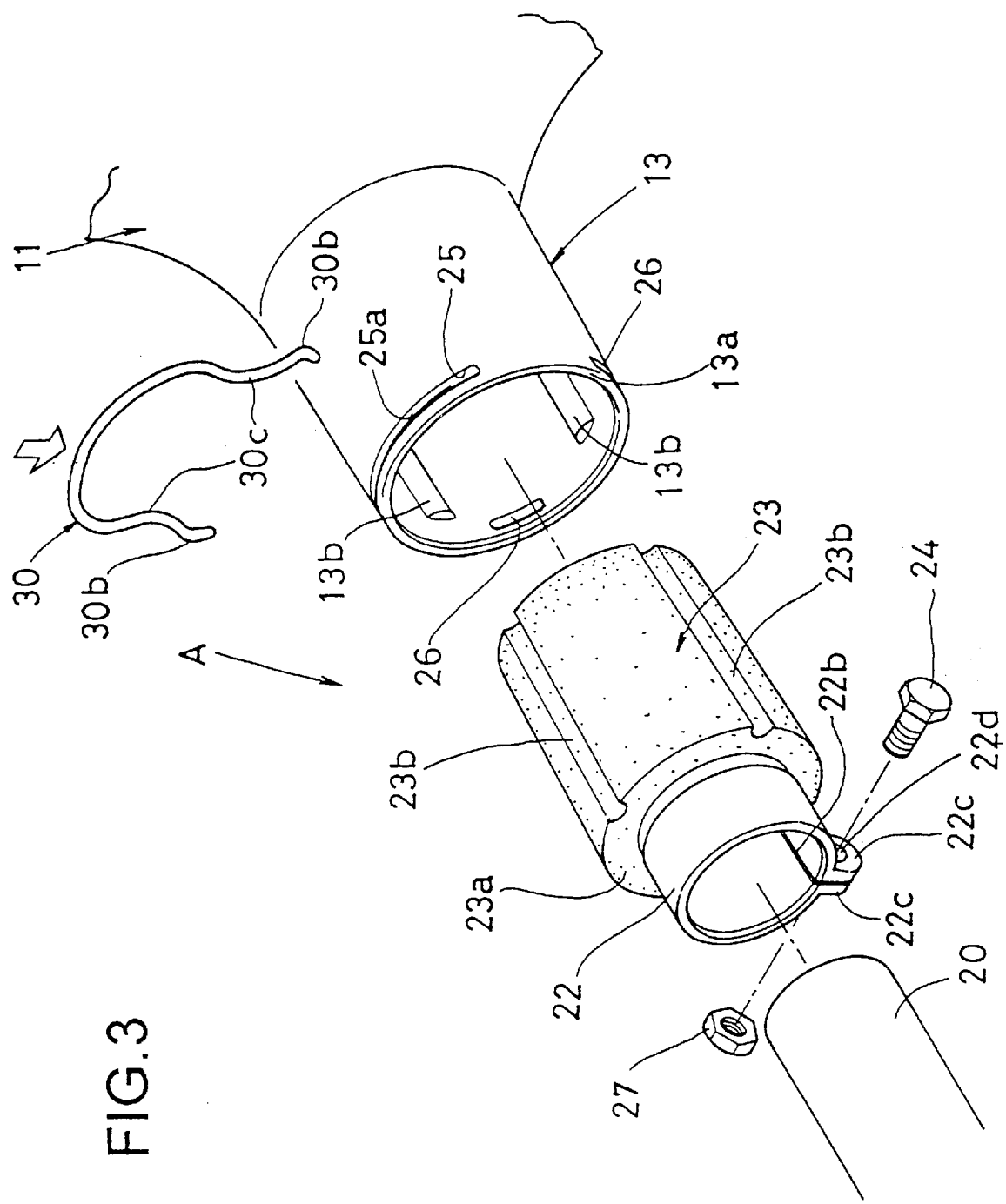
FIG. 3 is an exploded perspective view showing the coupling between the attachment sleeve portion and the operating rod shown in FIG. 1.

FIG. 1 shows the exterior of a prime mover 10 of a bush cutter 1, a portion of an operating rod 20, and a coupling portion "A" between an attachment sleeve portion 13 of a fan case 11 of the prime mover 10 and the operating rod 20. FIG. 2 is a longitudinal sectional view illustrating the coupling portion "A" shown in FIG. 1. FIG. 3 is an exploded perspective view showing the coupling portion "A".

The prime mover 10 is formed of a small air-cooled two-cycle gasoline engine, underneath of which a fuel tank 14 is disposed. This air-cooled two-cycle gasoline engine comprises an engine body (not shown), a cooling fan (not shown) and a centrifugal clutch (not shown). The engine body, the cooling fan and the centrifugal clutch are all covered by a fan case 11 made of a synthetic resin and mounted on the operating rod 20. A cylinder (not shown) located downstream of the fan case 11 is covered by a cylinder cover 12. The attachment sleeve portion 13 is formed integrally with the fan case 11 and disposed on one side of the fan case 11.

As shown in FIG. 2, in the innermost hollow portion of the attachment sleeve portion 13 of the coupling portion "A", a driving shaft 15, constituting an output power member of the centrifugal clutch, is rotatably held by way of a bearing 16. The driving shaft 15 is drivingly interlocked via the centrifugal clutch and the cooling fan with a crankshaft (not shown) of the engine body.

The outer peripheral wall of the rear end portion 20a of the operating rod 20 is fittingly inserted into the attachment sleeve portion 13, and the rear end portion 21a of a transmission shaft 21, which is rotatably received within the operating rod 20, is spline-fitted in the driving shaft 15 so that the transmission shaft 21 can be rotated in accordance with the rotation of the driving shaft 15.

The outer peripheral wall of the rear end portion 20a of the operating rod 20 is fittingly inserted into a tubular retainer 22, the outer peripheral wall of which is covered with a vibration isolator 23 such as a vibrationproof rubber. The tubular retainer 22 and the vibration isolator 23 are joined together with each other into one piece through four ribs 22a which are radially and equidistantly extended from the outer peripheral wall of the tubular retainer 22. These ribs 22a bite into the vibration isolator 23 so as to prevent the tubular retainer 22 from rotating or sliding. Alternatively, the tubular retainer 22 and the vibration isolator 23 can be joined together by heat-bonding or with an adhesive.

One side of the tubular retainer 22, which is opposite to the side facing the prime mover 10, is longitudinally extended outward from the vibration isolator 23. This side thus forms an elongated portion in which a sliding expanding slot 22b, extending in the axial direction thereof, is formed. A pair of lugs 22c are formed on a portion of the outer peripheral wall of the tubular retainer 22 at which the sliding expanding slot 22b is formed in such a manner that these lugs 22c face each other with the sliding expanding slot 22b being interposed therebetween. These lugs 22c are provided with through-holes 22d which are formed coaxially with each other. A fixing bolt 24 can be inserted through the through-holes 22d to tighten the lugs 22c with a fixing nut 27, thereby enabling the operating rod 20 to be firmly fixed to the tubular retainer 22.

The inner peripheral wall of the attachment sleeve portion 13 is tapered so as to facilitate the insertion of the vibration isolator 23. The vibration isolator 23 is formed of a vibration-proof rubber or the like and is also tapered. Insertion of the vibration isolator 23 into the attachment sleeve portion 13 is performed while being aligned and guided through engagements between a plurality of guide grooves 23b formed on the outer peripheral wall of the vibration isolator 23 and a plurality of guide ridges 13b formed on the inner wall of the attachment sleeve portion 13. The vibration isolator 23 is thereby allowed to be closely fitted in the attachment sleeve portion 13. The open end 13a of the attachment sleeve portion 13 extends more or less away from the external end face 23a of the vibration isolator 23. As seen from FIGS. 3 and 4, the attachment sleeve portion 13 is provided, at an upper portion thereof, with a pair of clip-introducing slits 25 facing each other along the circumference of the attachment sleeve portion 13 and, at a lower portion thereof, with a pair of clip-holding slits 26 facing each other along the circumference of the attachment sleeve portion 13. A portion of the outer peripheral wall of the open end 13a which is located between the aforementioned pair of clip-introducing slits 25 is formed into a clip-engaging groove 25a having the same width as that of the clip-introducing slits 25.

Figure 4:
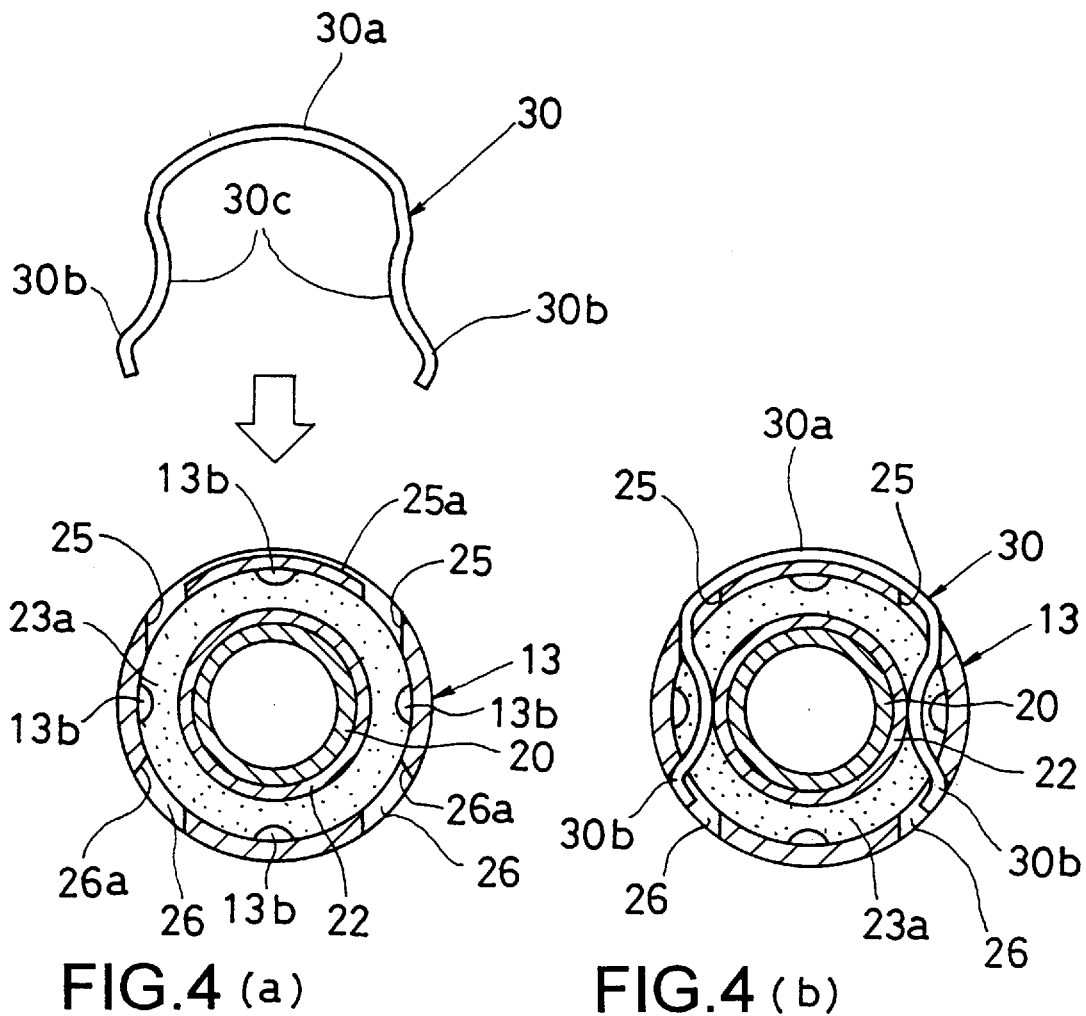
FIG. 4(a) is a cross-sectional view, along line IV—IV of FIG. 2, before the disengagement-preventing clip is introduced into the attachment sleeve portion.
FIG. 4(b) is a cross-sectional view, along line IV—IV of FIG. 2, after the disengagement-preventing clip has been introduced into the attachment sleeve portion.

As shown in FIG. 4, a disengagement-preventing clip 30 is designed to be inserted into the clip-introducing slits 25 and into the clip-holding slits 26. The disengagement-preventing clip 30 is made of a fine steel wire having a suitable elasticity and a general C-shape so that the middle portion 30a thereof is curved to conform with the upper peripheral portion of the attachment sleeve portion 13. Both distal end portions extending downward from this middle portion 30a are outwardly bent and form bent portions 30b. The interval between these bent portions 30b is designed so that when the disengagement-preventing clip 30 is in a free state, before being introduced into the attachment sleeve portion 13 (see FIG. 4(a)), the interval between the bent portions 30b is just larger than the interval between the outermost ends of the aforementioned pair of the clip-introducing slits 25 as well as the interval between the outermost ends of the clip-holding slits 26.

When inserting the disengagement-preventing clip 30 into the clip-introducing slits 25 and the clip-holding slits 26, the interval between the pair of bent portions 30b, constituting the distal end portions of the disengagement-preventing clip 30, is narrowed against the elastic force thereof so as to agree with the interval between the clip-introducing slits 25. The disengagement-preventing clip 30 is then inserted downward into the clip-introducing slits 25 to introduce the disengagement-preventing clip 30 into the interior of the attachment sleeve portion 13. After the bent portions 30b of the disengagement-preventing clip 30 have been further pushed downward into the interior of the attachment sleeve portion 13, the bent portions 30b are inserted into the clip-holding slits 26 from the inside thereof and allowed to extend outward. Since the distal ends of both bent portions 30b are extended inward to face each other, the operation of introducing the bent portions 30b of the disengagement-preventing clip 30 into the clip-holding slits 26 can be smoothly performed.

The introduction of the disengagement-preventing clip 30 is stopped as the middle portion 30a of the disengagement-preventing clip 30 is fitted in the clip-engaging groove 25a formed on the upper surface of the attachment sleeve portion 13. The disengagement-preventing clip 30 is, at this time, fixed in place as shown in FIG. 4(b). At this moment, the bent portions 30b of the disengagement-preventing clip 30 are biased so as to go away from each other and hence pressure-contacted respectively with inclined cut-faces 26a of the clip-holding slits 26. Since the inclined cut-faces 26a of the clip-holding slits 26 are shaped such that the outside portions of the aforementioned bent portions 30b are caused to come into contact with the inclined cut-faces 26a, the disengagement-preventing clip 30 is prevented from moving upward in the direction of slipping out of the clip-holding slits 26. The disengagement-preventing clip 30, therefore, can be firmly held in place as shown in FIG. 4(b).

It may be preferable to form inwardly constricted portions 30c at a portion which is designed to be contacted with the external end face 23a of the vibration isolator 23 between the middle portion 30a of the disengagement-preventing clip 30 and the bent portions 30b constituting the right and left tip ends of the disengagement-preventing clip 30 in such a manner that the interval between the constricted portions 30c is made slightly smaller than the outer diameter of the tubular retainer 22. This will enhance the pressing force of the bent portions 30b onto the inclined cut-faces 26a in the fixed state shown in FIG. 4(a).

The locations of the clip-introducing slits 25 and the clip-holding slits 26 in the attachment sleeve portion 13 are selected such that the disengagement-preventing clip 30 can be moderately press-contacted with the external end face 23a of the vibration isolator 23 as shown in FIG. 2.

The assembling and disassembling of the coupling portion "A" between the attachment sleeve portion 13 of the fan case 11 of the prime mover 10 and the operating rod 20 in the bush cutter 1 according to this embodiment, which is constructed as explained above, can be performed as follows. In assembling the coupling portion "A", the tubular retainer 22, integrally mounted thereon with the vibration isolator 23, is pushed into the attachment sleeve portion 13 thereby causing the vibration isolator 23 to be closely contacted with the inner peripheral wall of the attachment sleeve portion 13. Then, the disengagement-preventing clip 30 is introduced from outside into the interior of the attachment sleeve portion 13 through the clip-introducing slits 25 formed in the attachment sleeve portion 13. When the disengagement-preventing clip 30 is introduced into the attachment sleeve portion 13 in this manner, the inserted portion of the disengagement-preventing clip 30 is brought into moderate contact with the external end face 23a of the vibration isolator 23. In this way, the vibration isolator 23 and the tubular retainer 22 are prevented from slipping out of the attachment sleeve portion 13.

Subsequently, the operating rod 20 is inserted into the tubular retainer 22 to cause the transmission shaft 21 to be engaged with the driving shaft 15. The tubular retainer 22 is clamped by the fixing bolt 24 and the fixing nut 27 thereby fastening the operating rod 20 within the tubular retainer 22. The operation of coupling the operating rod 20 to the attachment sleeve portion 13 of the prime mover 10 is thus accomplished.

Detachment of the operating rod 20 from the attachment sleeve portion 13 can be performed by repeating the aforementioned procedures in reverse order. In particular, the detachment of the disengagement-preventing clip 30 from the attachment sleeve portion 13 can be performed easily by simply pulling the disengagement-preventing clip 30 upward from the outer peripheral wall side of the attachment sleeve portion 13 in opposition to the elastic outward expansion force of the bent portions 30b of the disengagement-preventing clip 30.

Since the coupling between the attachment sleeve portion 13 of the fan case 11 of the prime mover 10 and the operating rod 20 in the bush cutter 1 according to this embodiment is effected by interposing the vibration isolator 23, such as a vibrationproof rubber, between the attachment sleeve portion 13 and the operating rod 20, the transmission of vibration from the prime mover 10 to the operating rod 20 can be suppressed. Unpleasant vibration of the prime mover 10 is prevented in this way from reaching an operator handling the operating rod 20 to perform bush cutting. At the same time, by virtue of the particular disengagement-preventing construction of the vibration isolator 23, both assembling and disassembling of the coupling between the attachment sleeve portion 13 and the operating rod 20 can be conducted quite easily.

While one embodiment of this invention has been explained in detail for the purpose of illustration, it will be understood that the construction of the device can be varied without departing from the spirit and scope of the invention.

Figure 5:
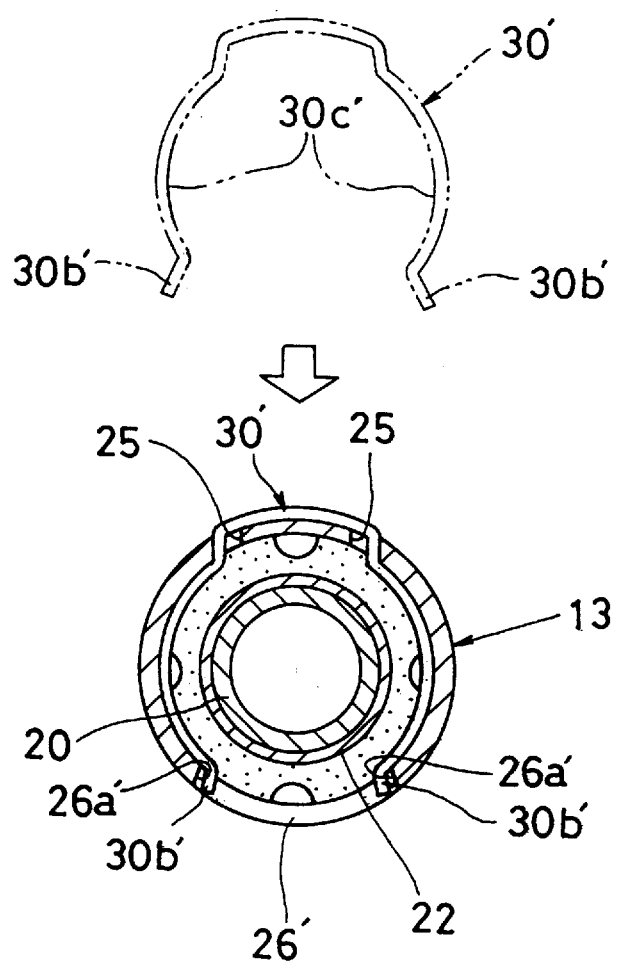
FIG. 5 is a cross-sectional view illustrating the coupling between the attachment sleeve portion and the operating rod according to another embodiment of this invention.
Figure 6:
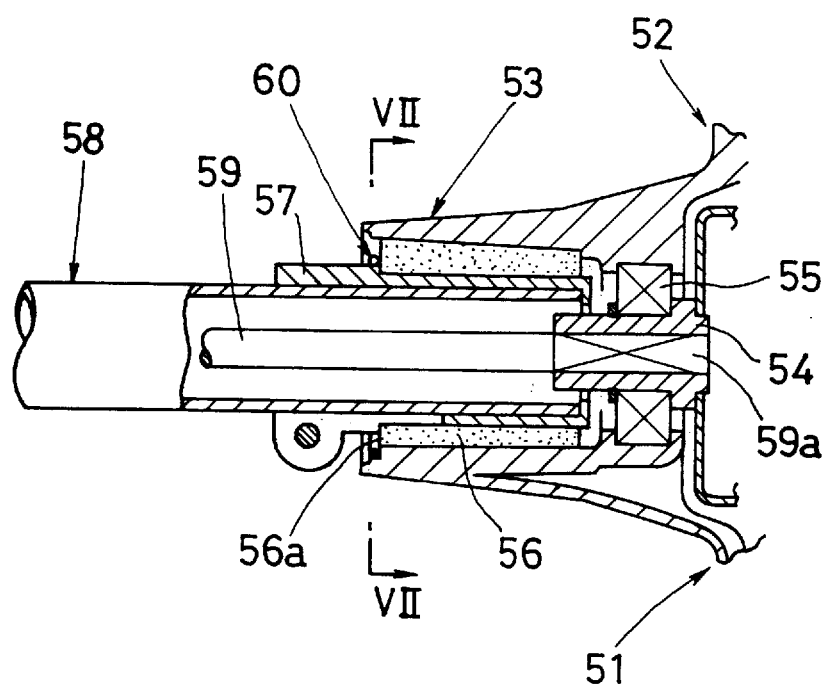
FIG. 6 is a longitudinal sectional view illustrating the coupling between an attachment sleeve portion and an operating rod according to a conventional bush cutter.
Figure 7:
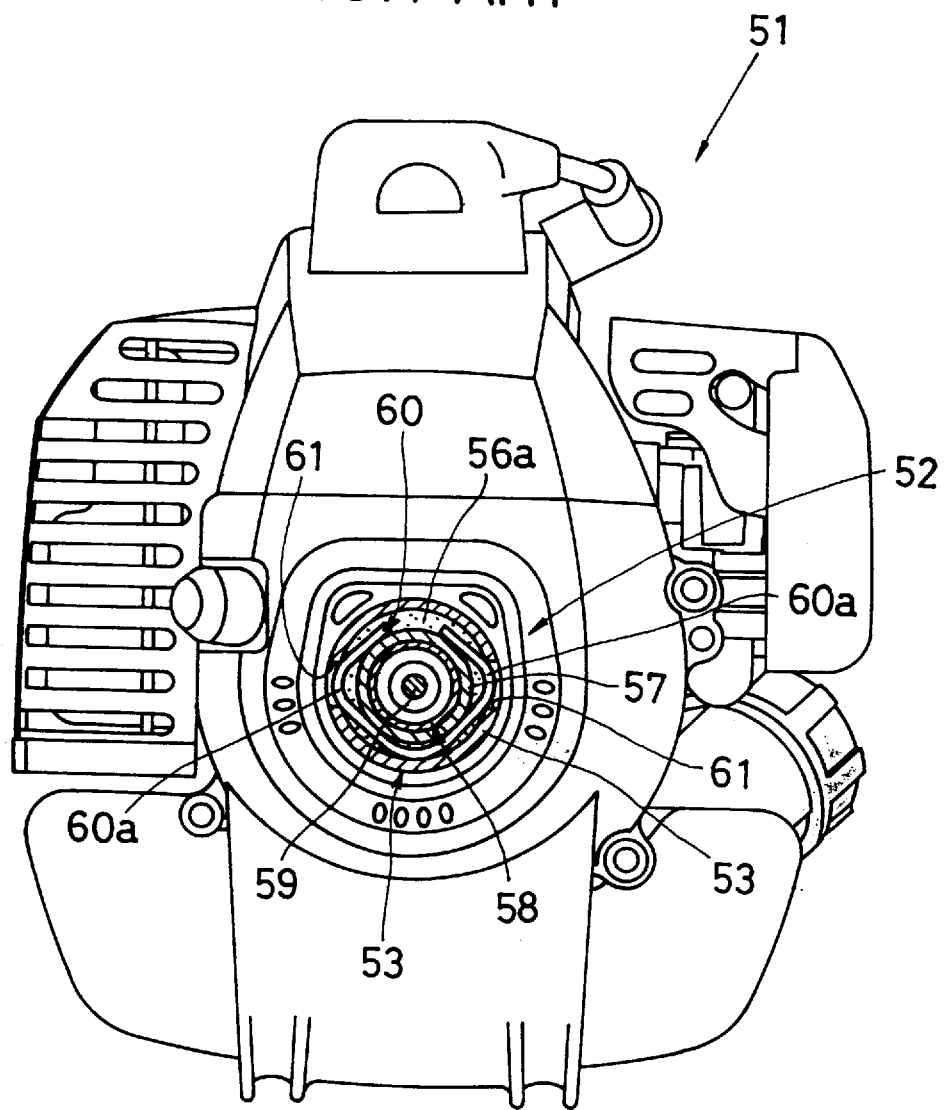
FIG. 7 is a cross-sectional view along line VII—VII of FIG. 6.

For example, the constructions of the slits formed at the upper and lower portions of the attachment sleeve portion 13 as well as of the disengagement-preventing clip are not confined to those described in the aforementioned embodiment. These slits may be modified as shown in FIG. 5. Namely, in the embodiment shown in FIG. 5, the clip-holding slit 26' in the attachment sleeve portion 13 is formed of a single slit of relatively large width. The outer opening of the clip-holding slit 26' is made relatively large and the inner opening thereof is made relatively small. In this case, the free distal end portions 30b' of the disengagement-preventing clip 30' are bent outward. With this combination of the clip-holding slit 26' and the disengagement-preventing clip 30', one may expect to obtain almost the same results as with the combination of the upper and lower slits and the disengagement-preventing clip of the first embodiment.

Although the direction of introducing the disengagement-preventing clip 30 or 30' may also be suitably varied, inserting the disengagement-preventing clip 30 or 30' from the upper part of the attachment sleeve portion 13 is preferable in view of the simplicity in assembling the device.

While the foregoing embodiments illustrate a case in which the disengagement-preventing mechanism of this invention is applied to a vibration isolator to be disposed at the coupling portion between an attachment sleeve portion of a prime mover and an operating rod in a bush cutter, the disengagement-preventing mechanism of this invention is not confined to the aforementioned embodiments but is applicable to various kinds of machines and tools.

The disengagement-preventing mechanism according to this invention comprises an attachment sleeve portion, an attachment member to be inserted in and engaged with the attachment sleeve portion, and a disengagement-preventing clip. The disengagement-preventing clip can be set in the attachment sleeve portion in such a manner that it can be contacted with the external end face of the vibration isolator mounted on the attachment member and engaged with a clip-holding slit formed along the peripheral direction of the attachment sleeve portion by simply introducing the disengagement-preventing clip from outside into the clip-holding slit. Detachment of the attachment member from the attachment sleeve portion can be performed easily by simply pulling the disengagement-preventing clip upward from the outer peripheral wall side of the attachment sleeve portion, thereby disengaging the disengagement-preventing clip from the clip-holding slit.

Mounting of the disengagement-preventing clip to the attachment sleeve portion and dismounting of the disengagement-preventing clip from the attachment sleeve portion can be performed with a "one touch" action.

When the disengagement-preventing mechanism of this invention is applied to the coupling portion between an attachment sleeve portion of a prime mover and an operating rod in a bush cutter, assembling and disassembling of the coupling portion can be performed precisely and promptly.

We claim:

1. A bush cutter comprising:

an attachment sleeve portion of a prime mover;

an operating rod to be inserted in and engaged with the attachment sleeve portion;

a vibration isolator to be interposed between the attachment sleeve portion and the operating rod; and a coupling portion provided with a disengagement-preventing clip;

said attachment sleeve portion being provided, at a peripheral wall thereof, with a clip-introducing slit extending in a circumferential direction of the attachment sleeve portion and with a clip-holding slit located so as to face the clip-introducing slit;

said disengagement-preventing clip being adapted to be introduced from outside into the clip-introducing slit and brought into contact with an external end face of the vibration isolator and to be engaged, by way of a distal end portion thereof, with the clip-holding slit.

2. The bush cutter according to claim 1, and further comprising a tubular retainer into which said operating rod is inserted and secured, said vibration isolator being integrally mounted on an outer peripheral wall surface of said tubular retainer.

3. The bush cutter according to claim 2, wherein said disengagement-preventing clip is formed of a C-shaped elastic wire having an intermediate curved section, a couple of externally projecting bent portions or externally extending bent ends engageable with said clip-holding slit.

4. The bush cutter according to claim 2, wherein said attachment sleeve portion is further provided, at a peripheral wall thereof, with a second clip-introducing slit, said clip-introducing slits spaced apart by a predetermined distance from each other along circumference of the attachment sleeve portion, a clip-engaging groove formed between said clip-introducing slits, and at least one clip-holding slit having an inclined cut-face engageable with said bent portions or ends of said disengagement-preventing clip for preventing said bent portions or ends from moving toward disengagement.

5. The bush cutter according to claim 1, wherein said disengagement-preventing clip is formed of a C-shaped elastic wire having an intermediate curved section, a couple of externally projecting bent portions or externally extending bent ends engageable with said clip-holding slit.

6. The bush cutter according to claim 5, wherein said attachment sleeve portion is further provided, at a peripheral wall thereof, with a second clip-introducing slit, said clip-introducing slits spaced apart by a predetermined distance from each other along circumference of the attachment sleeve portion, a clip-engaging groove formed between said clip-introducing slits, and at least one clip-holding slit having an inclined cut-face engageable with said bent portions or ends of said disengagement-preventing clip for preventing said bent portions or ends from moving toward disengagement.

7. The bush cutter according to claim 1, wherein said attachment sleeve portion is provided, at a peripheral wall thereof, with a second clip-introducing slit, said clip-introducing slits spaced apart by a predetermined distance from each other along circumference of the attachment sleeve portion, a clip-engaging groove formed between said clip-introducing slits, and at least one clip-holding slit having an inclined cut-face engageable with said bent portions or ends of said disengagement-preventing clip for preventing said bent portions or ends from moving toward disengagement.

8. A disengagement-preventing mechanism comprising:

an attachment sleeve portion;

an attachment member to be inserted in and engaged with the attachment sleeve portion; and a disengagement-preventing clip;

the attachment sleeve portion being provided, in a peripheral wall thereof, with a clip-introducing slit extending in a circumferential direction of the attachment sleeve portion and a clip-holding slit located so as to face the clip-introducing slit;

said disengagement-preventing clip being adapted to be introduced from outside into the clip-introducing slit and brought into contact with an external end face of the attachment member and to be engaged, by way of a distal end portion thereof, with the clip-holding slit.

9. The disengagement-preventing mechanism according to claim 8, wherein said disengagement-preventing clip is formed of a C-shaped elastic wire having an intermediate curved section, a couple of externally projecting bent portions or externally extending bent ends engageable with said clip-holding slit.

10. The disengagement-preventing mechanism according to claim 9, wherein said attachment sleeve portion is further provided, at a peripheral wall thereof, with a second clip-introducing slit, the clip-introducing slits spaced apart by a predetermined distance from each other along a circumference of the attachment sleeve portion, a clip-engaging groove formed between said clip-introducing slits, and at least one clip-holding slit having an inclined cut-face engageable with said bent portions or ends of said disengagement-preventing clip for preventing said bent portions or ends from moving toward disengagement.

* * * * *